United States Patent
Chen et al.

(10) Patent No.: US 8,300,891 B2
(45) Date of Patent: Oct. 30, 2012

(54) FACIAL IMAGE RECOGNITION SYSTEM FOR A DRIVER OF A VEHICLE

(75) Inventors: Yu-Song Chen, Changhua (TW); Chia-Tseng Chen, Changhua (TW)

(73) Assignee: Automotive Research & Testing Center, Changhua (TW)

( * ) Notice: Subject to any disclaimer, the term of this patent is extended or adjusted under 35 U.S.C. 154(b) by 394 days.

(21) Appl. No.: 12/763,308

(22) Filed: Apr. 20, 2010

(65) Prior Publication Data

US 2011/0091079 A1     Apr. 21, 2011

(30) Foreign Application Priority Data

Oct. 21, 2009   (TW) ............................... 98135621 A

(51) Int. Cl.
    *G06K 9/00*     (2006.01)
(52) U.S. Cl. ........................................ 382/103; 382/118
(58) Field of Classification Search .................. 382/115, 382/117, 118, 103
See application file for complete search history.

(56) References Cited

U.S. PATENT DOCUMENTS

2010/0066822 A1 *   3/2010   Steinberg et al. ............... 348/77
* cited by examiner

*Primary Examiner* — Brian Le
(74) *Attorney, Agent, or Firm* — Banner & Witcoff, Ltd.

(57) ABSTRACT

A facial image recognition system for a driver of a vehicle includes an image capturing unit, an image processing unit, and a warning unit. The image capturing unit is used for capturing facial images of the driver. The image processing unit is electrically coupled to the image capturing unit, has installed therein a facial frame selecting and position correcting method and an identification comparison algorithm, and receives the facial images of the driver from the image capturing unit. The warning unit is electrically coupled to the image processing unit, and emits a warning signal when the image processing unit determines that an identification of the driver has changed.

10 Claims, 6 Drawing Sheets

FACIAL IMAGE RECOGNITION SYSTEM FOR A DRIVER OF A VEHICLE

CROSS-REFERENCE TO RELATED APPLICATION

This application claims priority of Taiwanese Application No. 098135621, filed on Oct. 21, 2009.

BACKGROUND OF THE INVENTION

1. Field of the Invention

The present invention relates to a facial image recognition system, more particularly to a facial image recognition system for a driver of a vehicle.

2. Description of the Related Art

A conventional drunk driving warning system uses an alcohol concentration sensor for estimating the blood alcohol concentration of a driver, and then integrates the alcohol concentration sensor with a vehicle's ignition system to prevent driving of the vehicle when the driver is drunk. However, the driver may find ways to trick the drunk driving warning system, such as by having another person be subjected to the estimation performed by the alcohol concentration sensor.

SUMMARY OF THE INVENTION

Therefore, the object of the present invention is to provide a facial image recognition system for a driver of a vehicle which may determine whether the driver has changed.

Accordingly, the facial image recognition system of the present invention comprises an image capturing unit, an image processing unit, and a warning unit.

The image capturing unit is used for capturing facial images of the driver.

The image processing unit is electrically coupled to the image capturing unit, has installed therein a facial frame selecting and position correcting method and an identification comparison algorithm, and receives the facial images of the driver from the image capturing unit.

When the vehicle is stopped, the image processing unit utilizes the facial frame selecting and position correcting method to frame the facial images, and according to positional relations among facial features of the facial images, to correct the facial images. The image processing unit further utilizes the identification comparison algorithm to estimate a Euclidean distance of image features of the facial images in adjacent time intervals of a Fisher-face eigenspace to determine a possible point in time at which the driver may have switched with a substitute driver, and to determine whether an identification of the driver has changed using a mean of Euclidean distances from the image features to an origin in the Fisher-face eigenspace at intervals before and after the point in time at which the driver may have switched with a substitute driver.

The warning unit is electrically coupled to the image processing unit. The warning unit emits a warning signal when the image processing unit determines that the identification of the driver has changed.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
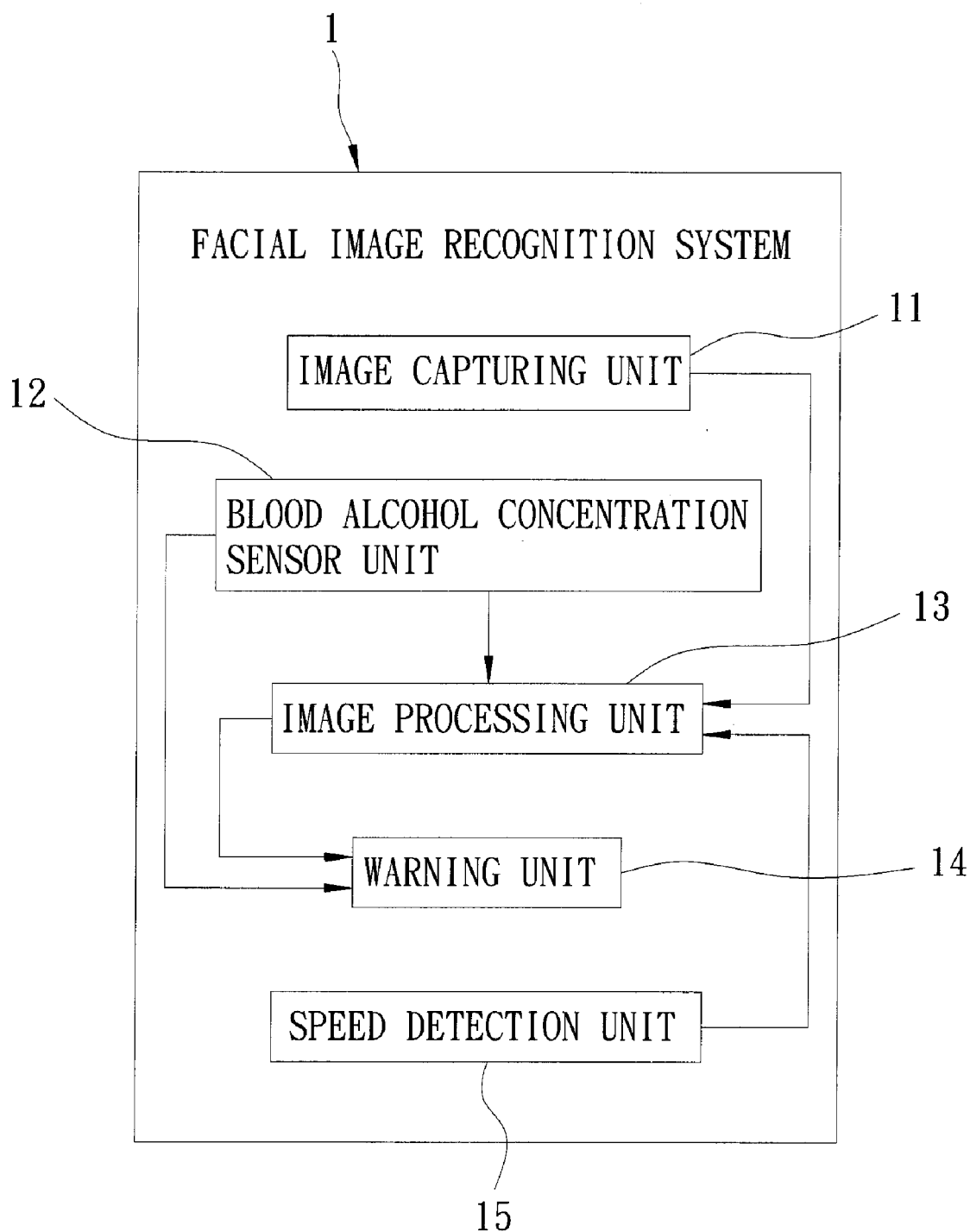
FIG. 1 is a schematic circuit block diagram of a facial image recognition system for a driver of a vehicle according to a preferred embodiment of the present invention.
Figure 2:
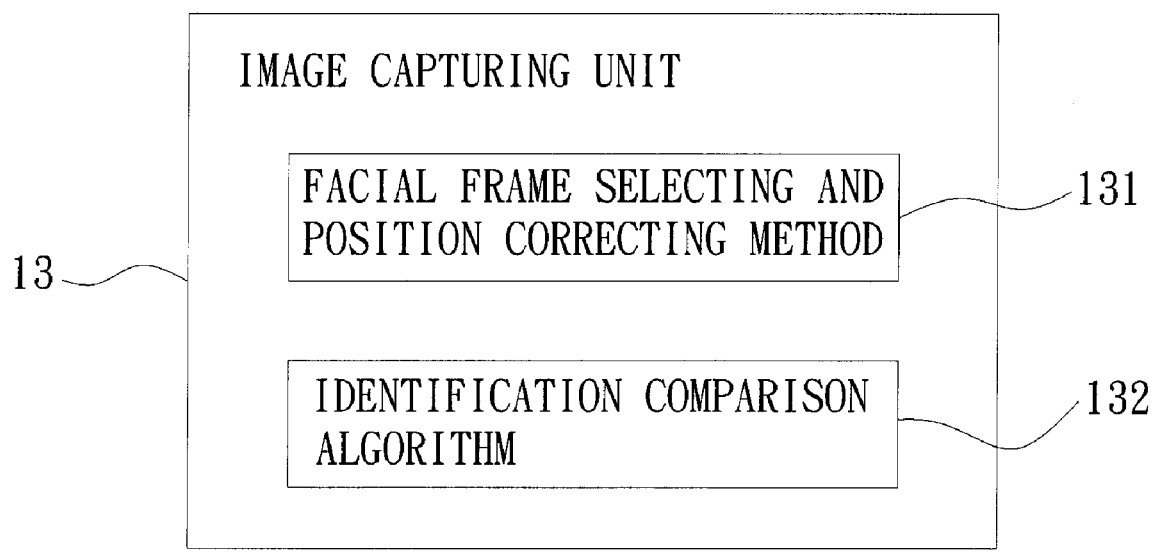
FIG. 2 is a schematic circuit block diagram of an image processing unit of the facial image recognition system of the preferred embodiment to illustrate the image processing unit having installed therein a facial frame selecting and position correcting method and an identification comparison algorithm.

Referring to FIGS. 1 and 2, a preferred embodiment of a facial image recognition system 1 according to the present invention is used for a driver of a vehicle. The facial image recognition system 1 comprises an image capturing unit 11, a blood alcohol concentration sensor unit 12, an image processing unit 13, a warning unit 14, and a speed detection unit 15.

The image capturing unit 11 is used for capturing facial images of the driver. In this embodiment, the image capturing unit 11 includes a video camera.

The blood alcohol concentration sensor unit 12 is electrically coupled to the image processing unit 13. The blood alcohol concentration sensor unit 12 detects the blood alcohol concentration of the driver, generates a notification signal when the alcohol concentration exceeds a predetermined standard value, and outputs the notification signal to the image processing unit 13. In some embodiments, the blood alcohol concentration sensor unit 12 is electrically coupled to the warning unit 14 and outputs the notification signal thereto. In this embodiment, the blood alcohol concentration sensor unit 12 includes a breath analyzer for detecting alcohol concentration of the driver from a breath sample.

The image processing unit 13 is electrically coupled to the image capturing unit 11, and has installed therein a facial frame selecting and position correcting method 131 and an identification comparison algorithm 132, and receives the facial images of the driver from the image capturing unit 11.

When the blood alcohol concentration of the driver does not exceed a predetermined value and the vehicle is stopped, the image processing unit 13 utilizes the facial frame selecting and position correcting method 131 to frame the facial images, and according to positional relations among facial features of the facial images, to correct the facial images. The image processing unit 13 further utilizes the identification comparison algorithm 132 to estimate a Euclidean distance of image features of the facial images in adjacent time intervals of a Fisher-face eigenspace to determine a possible point in time at which the driver may have switched with a substitute driver, and to determine whether an identification of the driver has changed using a mean of Euclidean distances from the image features to an origin in the Fisher-face eigenspace at intervals before and after the point in time at which the driver may have switched with a substitute driver.

The facial frame selecting and position correcting method 131 carried out by the image processing unit 13 comprises scanning a facial image, detecting a nose position via the scanned facial image, correcting the facial image, and framing the nose position.

Figure 3:
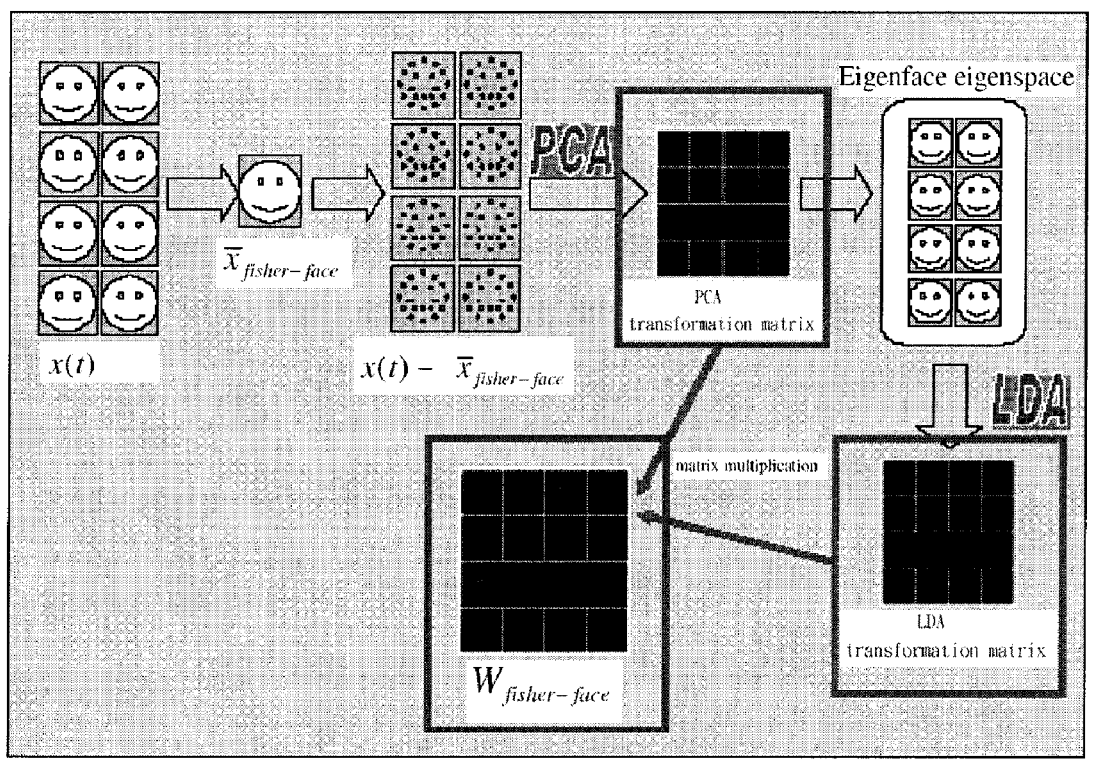
FIG. 3 is a schematic view to illustrate processes involved in the identification comparison algorithm.
Figure 4:
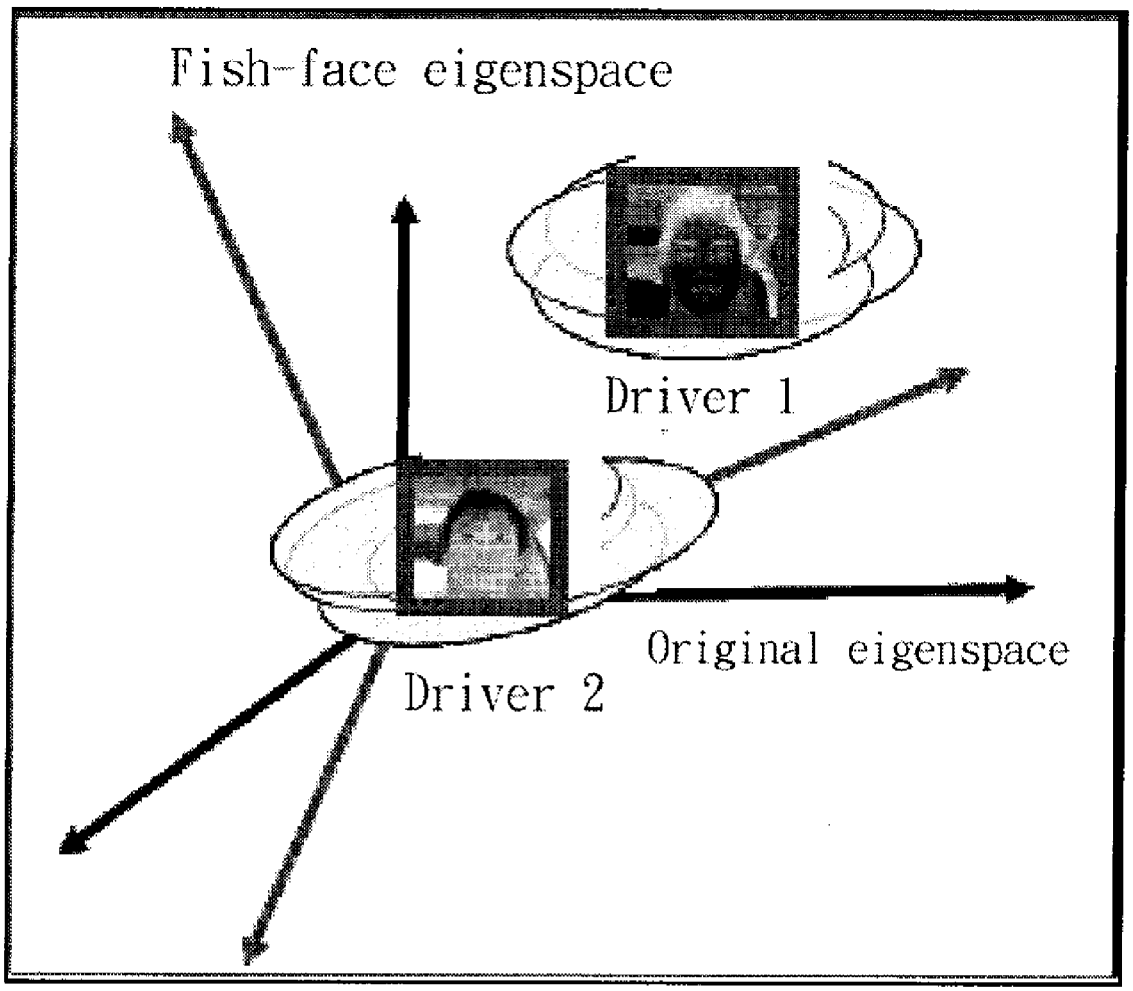
FIG. 4 is a schematic view to illustrate an eigenspace transformation.

Referring to FIGS. 2, 3, and 4, the identification comparison algorithm 132 satisfies the equation, $$y(t)=(x(t)-\bar{x}_{fisher\text{-}face}) \times W_{fisher\text{-}face}$$

where t is time, x(t) is an input facial image sample, $\bar{x}_{fisher\text{-}face}$ is a mean of facial images, corresponding to the Fisher-face eigenspace, $W_{fisher\text{-}face}$ is a transition matrix corresponding to the Fisher-face eigenspace and is the product of a PCA (Principal Component Analysis) transformation matrix and an LDA (Linear Discriminant Analysis) transformation matrix, and y(t) is a facial image after x(t) is projected to the Fisher-face eigenspace.

The Euclidean distance is calculated by the function, $$ED(I_i, I_j) = \sqrt{(I_{i1}-I_{j1})^2 + (I_{i2}-I_{j2})^2 + \ldots + (I_{il}-I_{jl})^2}$$

where $I_i$ and $I_j$ are coordinate positions of two data points of the image features of the facial images in adjacent time intervals of the Fisher-face eigenspace, $I_{i1}, I_{i2}, \ldots, I_{il}$ are components of $I_i$, and $I_{j1}, I_{j2}, \ldots, I_{jl}$ are components of $I_j$.

Each image feature has a feature center of gravity, and the Euclidean distance of the image features in adjacent time intervals of the Fisher-face eigenspace is calculated by the equation, $$CD(t) = ED\left(\frac{\sum_{\Delta t=1}^{d} I_{(t-\Delta t)}}{d}, \frac{\sum_{\Delta t=1}^{d} I_{(t-1-\Delta t)}}{d}\right)$$

where d is the number of screens of the image features in the time intervals, $I_{(t)}$ is a detected image feature coordinate position in the time intervals, and CD(t) is the Euclidean distance between two feature centers of gravity.

The possible point in time at which the driver may have switched with a substitute driver is determined to be the point at which CD(t) is greater than a predetermined first threshold value.

The Euclidean distance from the image feature to the origin in the Fisher-face eigenspace is calculated by the equation, $$AD(i) = \sqrt{(I_{i1})^2 + (I_{i2})^2 + \ldots + (I_{il})^2}$$

The mean of Euclidean distances from the image features to the origin in the Fisher-face eigenspace at intervals before and after the possible point in time at which the driver may have switched with a substitute driver is calculated by the equation, $$MD(t) = \left(\frac{\sum_{\Delta t=1}^{T} AD(t+\Delta t)}{T}\right) - \left(\frac{\sum_{\Delta t=1}^{T} AD(t-\Delta t)}{T}\right)$$

where T is one of the adjacent time intervals.

When MD(t) is greater than a predetermined second threshold value, the image processing unit 13 determines that the identification of the driver has changed and enables the warning unit 14 to emit the warning signal. In this embodiment, the predetermined second threshold value may be determined by a minimal value of the differences between the Euclidean distances from each feature center of to the origin in the Fisher-face eigenspace.

The warning unit 14 is electrically coupled to the image processing unit 13, and emits a warning signal when the image processing unit 13 determines that the identification of the driver has changed. The warning unit 14 may also be controlled by the image processing unit 13 to emit a warning signal when the blood alcohol concentration of the driver exceeds the predetermined value. In embodiments where the warning unit 14 is coupled electrically to the blood alcohol concentration sensor unit 12, the warning unit 14 emits the warning signal after receiving the notification signal from the blood alcohol concentration sensor unit 12.

The speed detection unit 15 is electrically coupled to the image processing unit 13, and detects a speed of the vehicle and outputs a corresponding vehicle speed signal to the image processing unit 13.

Figure 5:
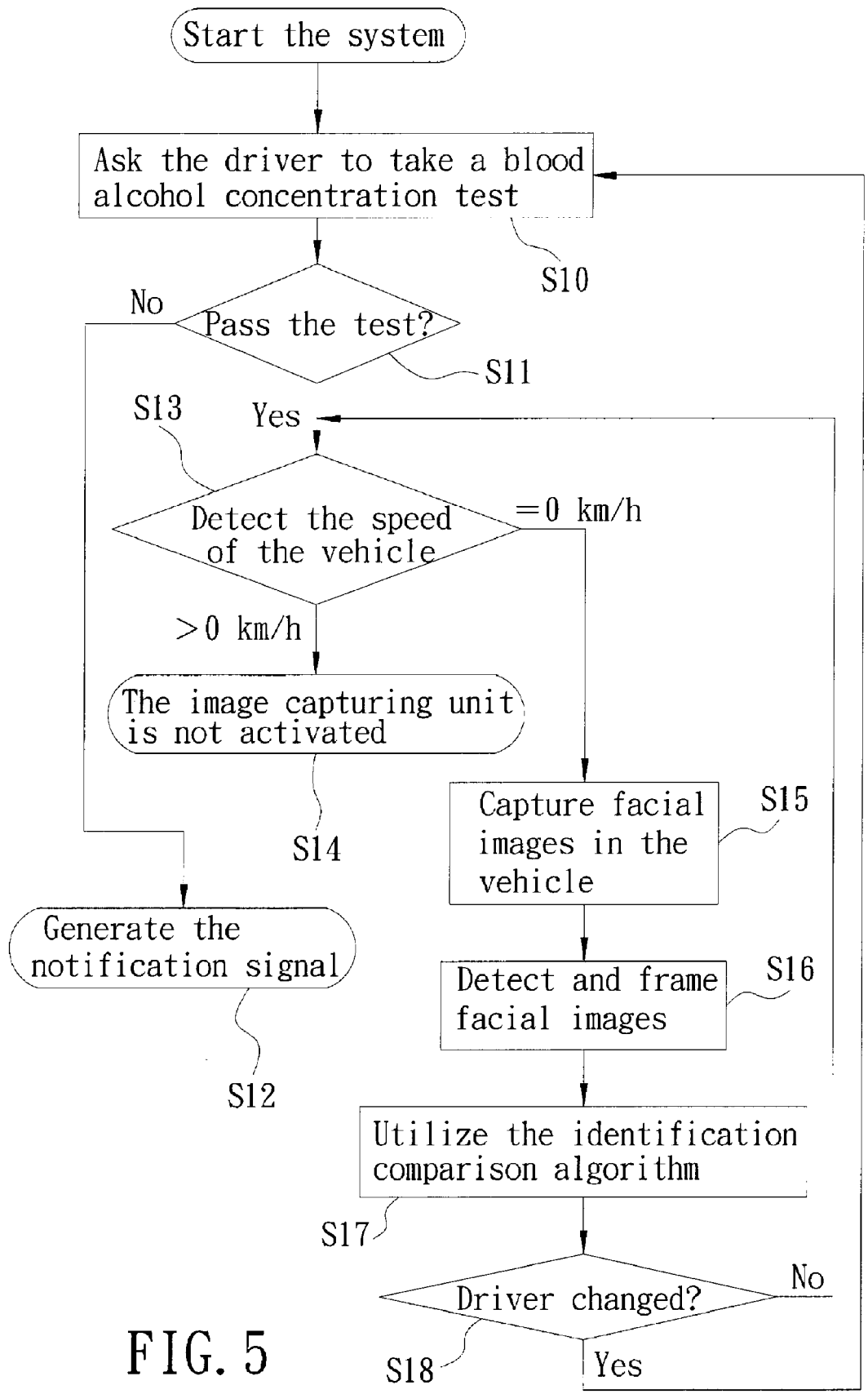
FIG. 5 is a flow chart of a facial image recognition method for a driver of a vehicle according to a first preferred embodiment of the present invention.

Referring to FIGS. 1 and 5, a facial image recognition method according to a first preferred embodiment of the present invention is described below.

Firstly, the facial image recognition system 1 is turned on. This may occur automatically when the vehicle is started.

In step S10, the facial image recognition system 1 sends a request to the driver to ask him/her to take a blood alcohol concentration test from the blood alcohol concentration sensor unit 12. For example, the image processing unit 13 may cooperate with the control system of the vehicle so emit such a request to the driver.

Next, in step S11, the blood alcohol concentration sensor unit 12 determines whether the driver passes the test, depending on whether the blood alcohol concentration of the driver exceeds the predetermined standard value. If not, the blood alcohol concentration sensor unit 12 generates and outputs the notification signal in step S12.

If the driver passes the test, on the other hand, the speed detection unit 15 detects the speed of the vehicle in step S13. If the vehicle is not stopped, then the image capturing unit 11 is not activated in step S14. On the other hand, if the vehicle is stopped, then the facial images of the driver in the vehicle are captured by the image capturing unit 11 in step S15.

Next, the facial images are detected and framed by the image processing unit 13 in step S16, and in step S17, the image processing unit 13 utilizes the identification comparison algorithm 132.

In step S18, if the identification of the driver has not changed, the flow returns to step S13. However, in step S18, if the identification of the driver has changed, the flow returns to step S10.

Figure 6:
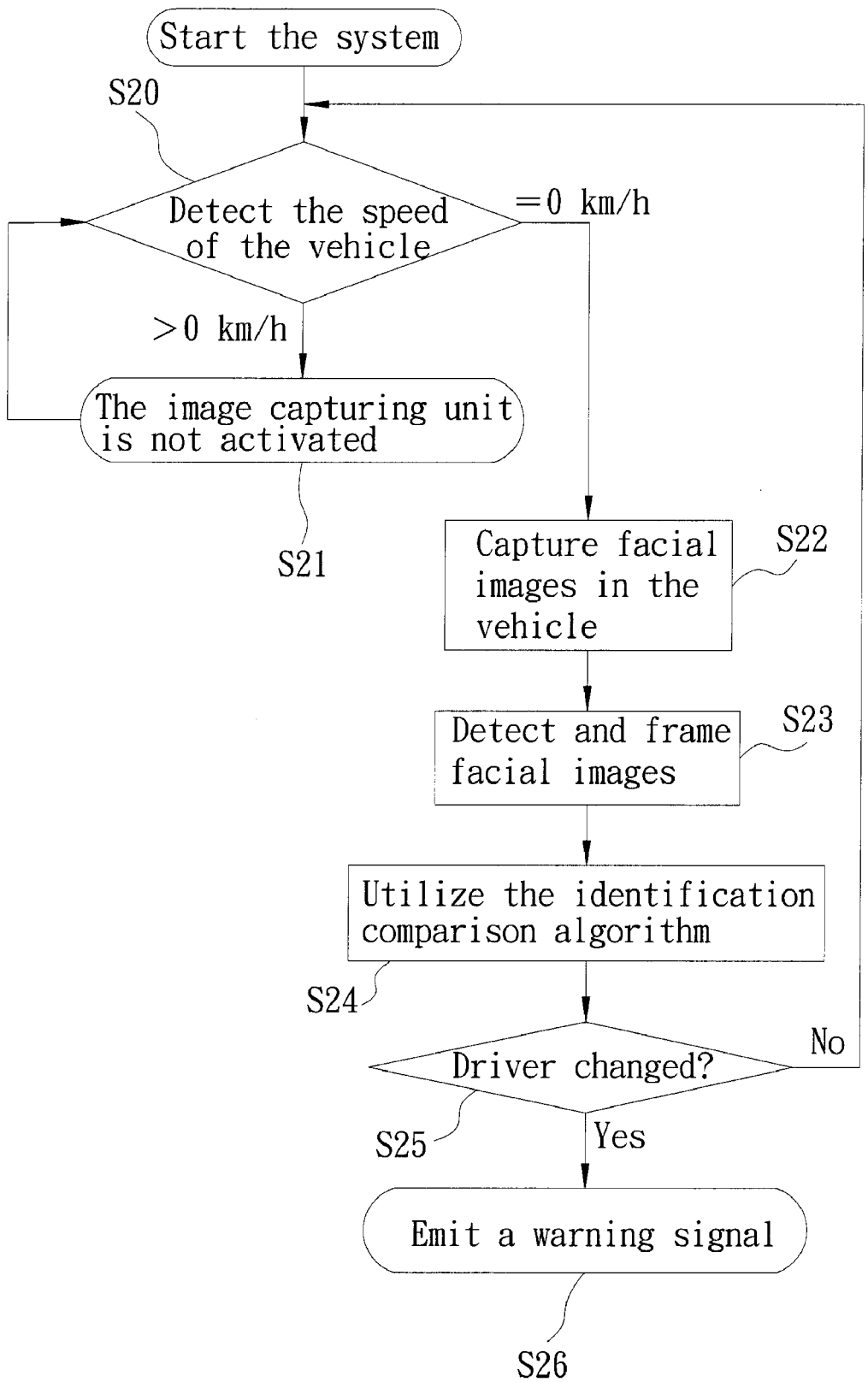
FIG. 6 is a flow chart of a facial image recognition method for a driver of a vehicle according to a second preferred embodiment of the present invention.

FIGS. 1 and 6 illustrate a second preferred embodiment of the facial image recognition method according to the present invention. The second preferred embodiment differs from the first preferred embodiment in the following aspects.

In the facial image recognition method of the second preferred embodiment, the facial image recognition system 1 may function as an anti-theft system.

Firstly, the facial image recognition system 1 is turned on. As in the case of the first preferred embodiment, this may occur automatically when the vehicle is started.

Next, in step S20, the speed detection unit 15 detects the speed of the vehicle. If the vehicle is not stopped, then the image capturing unit 11 is not activated in step S21. On the other hand, if the vehicle is stopped, then the facial images of the driver in the vehicle are captured by the image capturing unit 11 in step S22.

Next, the facial images are detected and framed by the image processing unit 13 in step S23, and in step S24, the image processing unit 13 utilizes the identification comparison algorithm 132.

In step S25, if the identification of the driver has not changed, the flow returns to step S20. However, in step S25, if the identification of the driver has changed, the warning unit 14 emits a warning signal in step S26.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A facial image recognition system for a driver of a vehicle comprising:
    an image capturing unit for capturing facial images of the driver;
    an image processing unit electrically coupled to said image capturing unit and having installed therein a facial frame selecting and position correcting method and an identification comparison algorithm, said image processing unit receiving the facial images of the driver from said image capturing unit,
    when the vehicle is stopped, said image processing unit utilizing said facial frame selecting and position correcting method to frame the facial images, and according to positional relations among facial features of the facial images, to correct the facial images, said image processing unit further utilizing said identification comparison algorithm to estimate a Euclidean distance of image features of the facial images in adjacent time intervals of a Fisher-face eigenspace to determine a possible point in time at which the driver may have switched with a substitute driver, and to determine whether an identification of the driver has changed using a mean of Euclidean distances from the image features to an origin in the Fisher-face eigenspace at intervals before and after said point in time at which the driver may have switched with a substitute driver; and
    a warning unit electrically coupled to said image processing unit, said warning unit emitting a warning signal when said image processing unit determines that the identification of the driver has changed.

2. The facial image recognition system as claimed in claim 1, wherein said image processing unit utilizes said facial frame selecting and position correcting method and further utilizes said identification comparison algorithm when the blood alcohol concentration of the driver does not exceed a predetermined value and the vehicle is stopped.

3. The facial image recognition system as claimed in claim 2, further comprising a blood alcohol concentration sensor unit electrically coupled to said image processing unit, said blood alcohol concentration sensor unit detecting the blood alcohol concentration of the driver, generating a notification signal when the alcohol concentration exceeds a predetermined standard value, and outputting the notification signal to said image processing unit.

4. The facial image recognition system as claimed in claim 1, wherein said identification comparison algorithm satisfies the equation, $$y(t) = (x(t) - \bar{x}_{fisher\text{-}face}) \times W_{fisher\text{-}face}$$

where t is time, x(t) is an input facial image, $\bar{x}_{fisher\text{-}face}$ facial is a mean of facial images corresponding to the Fisher-face eigenspace, $W_{fisher\text{-}face}$ is a transition matrix corresponding to the Fisher-face eigenspace, and y(t) is a facial image after x(t) is projected to the Fisher-face eigenspace.

5. The facial image recognition system as claimed in claim 4, wherein the Euclidean distance is calculated by the function, $$ED(I_i, I_j) = \sqrt{(I_{i1} - I_{j1})^2 + (I_{i2} - I_{j2})^2 + \ldots + (I_{il} - I_{jl})^2}$$

where $I_i$ and $I_j$ are coordinate positions of two data points of the image features of the facial images in adjacent time intervals of the Fisher-face eigenspace, $I_{i1}, I_{i2}, \ldots, I_{il}$ are components of $I_i$, and $I_{j2}, \ldots, I_{jl}$ are components of $I_j$.

6. The facial image recognition system as claimed in claim 5, wherein each image feature has a feature center of gravity, and the Euclidean distance of the image features in adjacent time intervals of the Fisher-face eigenspace is calculated by the equation, $$CD(t) = ED\left(\frac{\sum_{\Delta t=1}^{d} I_{(t-\Delta t)}}{d}, \frac{\sum_{\Delta t=1}^{d} I_{(t-1-\Delta t)}}{d}\right)$$

where d is the number of screens of the image features in the time intervals, $I_{(t)}$ is a detected image feature coordinate position in the time intervals, and CD(t) is the Euclidean distance between two feature centers of gravity, wherein said possible point in time at which the driver may have switched with a substitute driver is determined to be the point at which CD(t) is greater than a predetermined first threshold value.

7. The facial image recognition system as claimed in claim 6, the Euclidean distance from the image feature to the origin in the Fisher-face eigenspace is calculated by the equation, $$AD(i) = \sqrt{(I_{i1})^2 + (I_{i2})^2 + \ldots + (I_{il})^2}.$$

8. The facial image recognition system as claimed in claim 7, the mean of Euclidean distances from the image features to the origin in the Fisher-face eigenspace at intervals before and after said possible point in time at which the driver may have switched with a substitute driver is calculated by the equation, $$MD(t) = \left(\frac{\sum_{\Delta t=1}^{T} AD(t + \Delta t)}{T}\right) - \left(\frac{\sum_{\Delta t=1}^{T} AD(t - \Delta t)}{T}\right)$$

where T is one of the adjacent time intervals, wherein when MD(t) is greater than a predetermined second threshold value, said image processing unit can determines that the identification of the driver has changed and enables said warning unit to emit the warning signal.

9. The facial image recognition system as claimed in claim 1, wherein said facial frame selecting and position correcting method carried out by said image processing unit comprises scanning a facial image, detecting a nose position via the scanned facial image, correcting the facial image, and framing the nose position.

10. The facial image recognition system as claimed in claim 1, further comprising a speed detection unit electrically coupled to said image processing unit, said speed detection unit detecting a speed of the vehicle and outputting a corresponding vehicle speed signal to said image processing unit.

* * * * *